(12) United States Patent
Chew

(10) Patent No.: US 10,791,019 B2
(45) Date of Patent: Sep. 29, 2020

(54) EDGE OR FOG GATEWAY ASSISTED OUT-OF-BAND REMOTE MANAGEMENT FOR MANAGED CLIENT DEVICES

(71) Applicant: Intel Corporation, Santa Clara, CA (US)

(72) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 15/856,478

(22) Filed: Dec. 28, 2017

(65) Prior Publication Data

US 2019/0044793 A1 Feb. 7, 2019

(51) Int. Cl.
*H04L 12/24* (2006.01)
*H04L 29/08* (2006.01)
(Continued)

(52) U.S. Cl.
CPC ...... *H04L 41/0672* (2013.01); *H04L 41/0226* (2013.01); *H04L 41/04* (2013.01);
(Continued)

(58) Field of Classification Search
CPC ....... H04L 67/104; H04L 67/14; H04L 67/42; H04L 41/0672; H04L 67/125;
(Continued)

(56) References Cited

U.S. PATENT DOCUMENTS 8,244,864 B1 * 8/2012 Bahl .................... H04L 67/148
709/225
8,832,494 B2 9/2014 Ouyang et al.
(Continued)

FOREIGN PATENT DOCUMENTS

CN 104283911 A 1/2015
EP 1880309 B1 8/2014

OTHER PUBLICATIONS

Lantronix, "Lantronix Spider KVM Over IP Switch", Mar. 28, 2007, https://www.lantronix.com/products/lantronix-spider/.*
(Continued)

*Primary Examiner* — Ramy M Osman
(74) *Attorney, Agent, or Firm* — Schwabe, Williamson & Wyatt, P.C.

(57) ABSTRACT

Embodiments herein relate to out-of-band connections for remote diagnosis and repair of client devices. In various embodiments, an apparatus for remote management of a client device may include a local area network (LAN) port, a wide area network (WAN) port, and a remote communications manager to provide to a remote management service, an identification of the apparatus as a gateway device for a LAN of the remote managed client computer. In embodiments, the identification may assist the remote management service in invoking the remote managed client computer to establish a remote management session via an out-of-band (OOB) channel with the gateway device. In embodiments, a gateway-assisted failover during a remote management session between a remote management console and a managed client device may be provided. Other embodiments may be described and/or claimed.

14 Claims, 10 Drawing Sheets

(51) Int. Cl.
*H04L 12/66* (2006.01)
*H04W 4/70* (2018.01)

(52) U.S. Cl.
CPC ........ H04L 41/5019 (2013.01); H04L 67/025 (2013.01); H04L 67/1074 (2013.01); H04L 67/125 (2013.01); H04L 12/66 (2013.01); H04L 67/36 (2013.01); H04W 4/70 (2018.02)

(58) Field of Classification Search
CPC . H04L 41/0226; H04L 41/04; H04L 41/5019; H04L 67/025; H04L 67/1074; H04L 12/66; H04L 67/36; H04W 4/70
See application file for complete search history.

(56) References Cited

U.S. PATENT DOCUMENTS

| | | | |
|---|---|---|---|
| 9,009,279 B2* | 4/2015 | Kuhles | H04L 41/022 709/223 |
| 9,241,352 B2* | 1/2016 | Lim | H04W 76/10 |
| 10,652,107 B2* | 5/2020 | Ramachandran | H04L 41/22 |
| 2001/0005382 A1* | 6/2001 | Cave | H04L 65/1069 370/466 |
| 2006/0259612 A1* | 11/2006 | De Oliveira | H04L 67/08 709/224 |
| 2007/0058657 A1* | 3/2007 | Holt | H04L 41/0226 370/438 |
| 2007/0115992 A1* | 5/2007 | Weinstock | H04L 41/0806 370/392 |
| 2011/0085564 A1* | 4/2011 | Taylor | H04L 67/125 370/401 |
| 2011/0154316 A1* | 6/2011 | Khosravi | G06F 8/654 717/173 |
| 2013/0007224 A1 | 1/2013 | Yang | |
| 2013/0125230 A1* | 5/2013 | Koponen | H04L 41/0803 726/13 |
| 2013/0232245 A1 | 9/2013 | Antosz et al. | |
| 2014/0214525 A1 | 7/2014 | Tsai et al. | |
| 2015/0215414 A1* | 7/2015 | Kariman | H04L 67/26 709/223 |
| 2015/0271130 A1 | 9/2015 | McCallum et al. | |
| 2016/0019741 A1 | 1/2016 | Dua et al. | |
| 2016/0036628 A1* | 2/2016 | Gupta | H04W 4/70 455/420 |
| 2017/0264615 A1* | 9/2017 | Yasaki | H04L 41/0803 |
| 2018/0159745 A1* | 6/2018 | Byers | H04L 41/0896 |
| 2018/0183653 A1* | 6/2018 | Chew | H04L 41/0654 |
| 2019/0044793 A1* | 2/2019 | Chew | H04L 67/42 |
| 2019/0044794 A1* | 2/2019 | Chew | H04L 41/0672 |
| 2019/0088233 A1* | 3/2019 | Chew | G06F 21/82 |

OTHER PUBLICATIONS

OutPost Sentinal, "In Band / Out of Band Network Access—KVM over IP", Mar. 1, 2003, http://www.outpostsentinel.com/inband.shtml.*

OutPost Sentinal, "Outpost's KVM Solutions", Mar. 1, 2003, http://www.outpostsentinel.com/kvmsolutions.shtml.*

"The Billion WWAN Failover Manager", Apr. 2017, 15 pages, http://www.billion.com/upload/web/Brochure/Billion-Failover-Manager-20170330.pdf; retrieved on Apr. 11, 2018.

"Secure management for distributed edge networks", Jul. 2016, 2 pages, http://opengear.com/wp-content/uploads/2016/07/Remote-Site_Management.pdf, retrieved on Apr. 11, 2018.

* cited by examiner

EDGE OR FOG GATEWAY ASSISTED OUT-OF-BAND REMOTE MANAGEMENT FOR MANAGED CLIENT DEVICES

FIELD

Embodiments of the present disclosure generally relate to the field of computing, and more particularly to out-of-band keyboard, video, and/or mouse (KVM) provision for remote management sessions.

BACKGROUND

When a client computing device is down (e.g. hard disk crash), out-of-band (OOB) remote management of the client computing device may be performed through a remote management console, and a management controller that is co-located with the computing environment of the client computing device. Examples of the management controller may include management engine, security co-processor, Desktop and mobile Architecture Hardware (DASH) compliant Network Interface Card (NIC). When a client computing device is down, the management controller may initiate a help request to the remote management console, via e.g., a client initiated remote access (CIRA) packet. In response, the remote management console may initiate an OOB management session, such as for example, a keyboard, video, and/or mouse (KVM) session with the client computing device (typically through the management controller) to remotely diagnose and fix the faulty client computing device. The management session between the client computing device and the remote management console may often occur via a wide area network (WAN) communication channel with multiple network hops.

The management controller co-located with the main computing environment of the client computing device may direct the client computing device to redirect its display output video stream to the remote management console via a network (e.g., the WAN). A management session between the client computing device and the remote management console may be communicated through a WAN communication channel with multiple network hops. Among other issues, this approach may result in sending an uncompressed video stream through a network, which may consume significant bandwidth. In some cases, excessive WAN network latencies or a temporary disruption in network bandwidth may distort KVM video quality or cause the KVM session to terminate prematurely. Additionally, KVM keyboard and mouse inputs from a remote management console including input/output (IO) redirection features (e.g. USB or boot disk redirection) may also be subject to the above network bandwidth constraints of a WAN.

Furthermore, during a recovery process, a client computing device may not be usable and may continuously display a blank screen or a debug screen until it is fixed; in addition, repair of a client computing device may take some time to accomplish. If a client computing device (e.g. digital signage, kiosk . . . ) is deployed in a public place (e.g. shopping complex, airport, street corner . . . ), having a blank screen during diagnostic and repair may not be aesthetically appealing to viewers and/or end users. The blank screen may also cause disruption in commerce (e.g., flight information not available, unable to place an order through a kiosk, and the like). In some cases, a client computing device will remain non-functional until it is fixed onsite (e.g., as might be required for a faulty hard disk or memory replacement).

BRIEF DESCRIPTION OF THE DRAWINGS

Embodiments of the remote management devices and methods of the present disclosure may overcome these limitations. The techniques will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
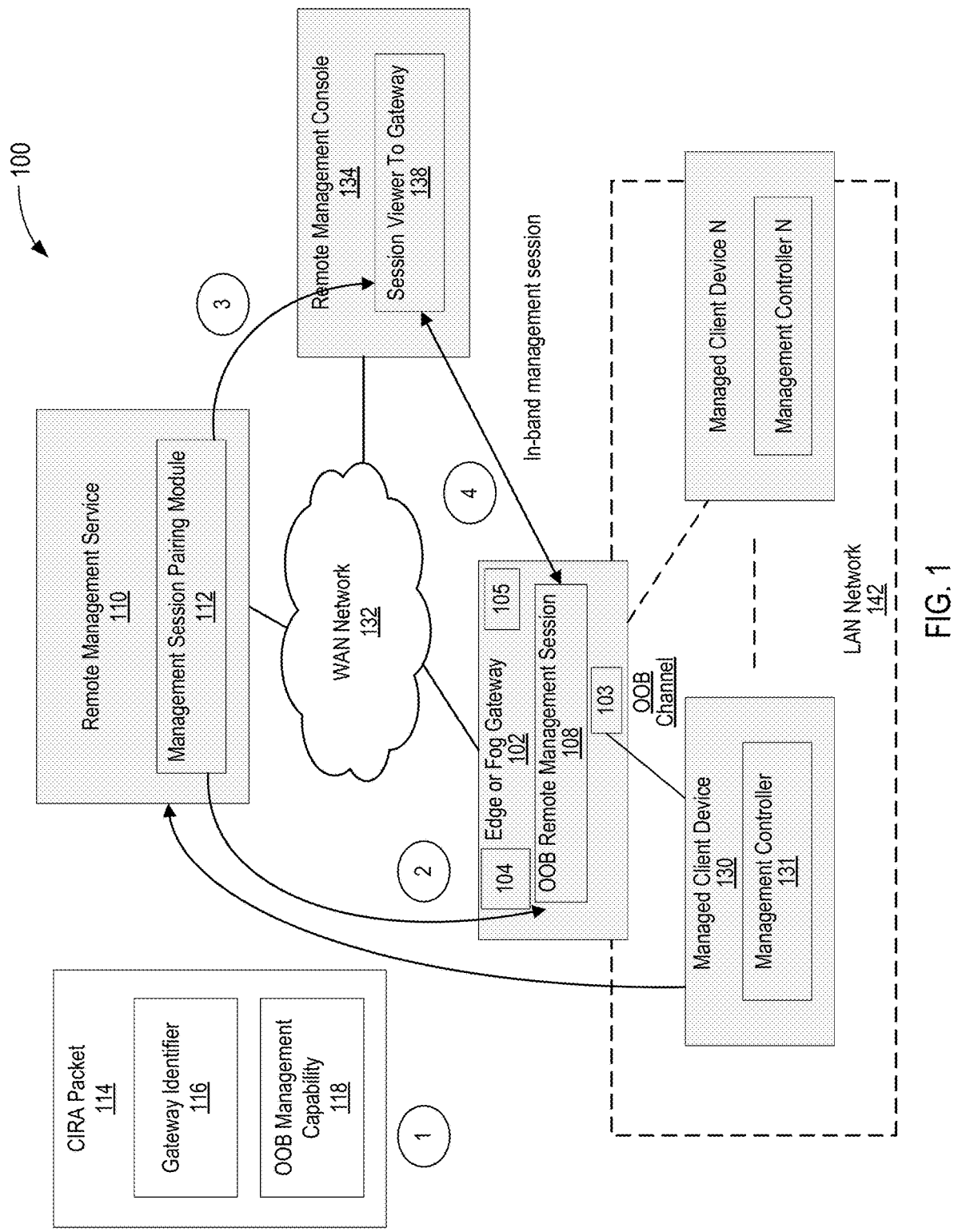
FIG. 1 is a functional block diagram of a computing environment that implements a gateway-assisted remote management session between a remote management console and a managed client device, according to various embodiments.

Embodiments of the present disclosure describe devices, systems, and techniques to provide a gateway-assisted out-of-band (OOB) remote management session between a remote management console and a managed client device ("client device"). In embodiments, an edge or Fog network device (e.g., an edge or Fog gateway) can include a remote communications manager to assist in establishing an out-of-band connection between the gateway device and the client device. In various embodiments, a remote management service may receive an identifier of the device as a gateway device of the remote managed client computer to assist the remote management service in locating the gateway device in the WAN, and invoke the remote managed client computer to establish a remote management session via an out-of-band (OOB) channel with the gateway device through a local area network (LAN). In some embodiments, the gateway device may assist in providing a failover user interface to the client device during the remote management session.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a computing environment 100 that implements a gateway-assisted remote management session between a remote management console and a managed client device, according to various embodiments. In some embodiments, a gateway 102 may be a network device such as an edge or Fog gateway. In embodiments, gateway 102 may include a LAN port 103 and a WAN port 105 and a remote communications manager 104. In embodiments, remote communications manager 104 may be coupled to LAN port 103 and WAN port 105 and operatively coupled to a processor or a cloud computing infrastructure to provide to a remote management service 110, a gateway identifier of gateway 102 as the gateway device of a remote managed client computer 130 ("managed client device 130"). In various embodiments, in FIG. 1, managed client device 130 may transmit a network packet, e.g., a client initiated remote access (CIRA) packet 114, to remote management service 110 requesting diagnosis or repair (e.g., "1" of FIG. 1). In embodiments, CIRA packet 114 may include a gateway identifier field 116 and/or an out-of-band (OOB) management capability field 118.

In embodiments, the gateway identifier may assist remote management service 110 in identifying or locating gateway 102 in a WAN network 132 to invoke managed client device 130 to establish an out-of-band (OOB) remote management session 108 via an OOB channel with gateway 102. In embodiments, if OOB management capability field 118 is indicated, management session pairing module 112 of remote management service 110 may invoke a management controller 131 of managed client device 130 to establish remote management session 108 with gateway 102 ("2") through an e.g., peer-to-peer OOB single hop LAN connection. According to the embodiment, management session pairing module 112 may invoke remote management console 134 (at "3") to initiate a remote in-band management session through a direct peer-to-peer connection ("4") with gateway 102. In embodiments, the remote management console 134 may include a session viewer 138 to gateway 102 through which to conduct the remote in-band management session.

Figure 6:
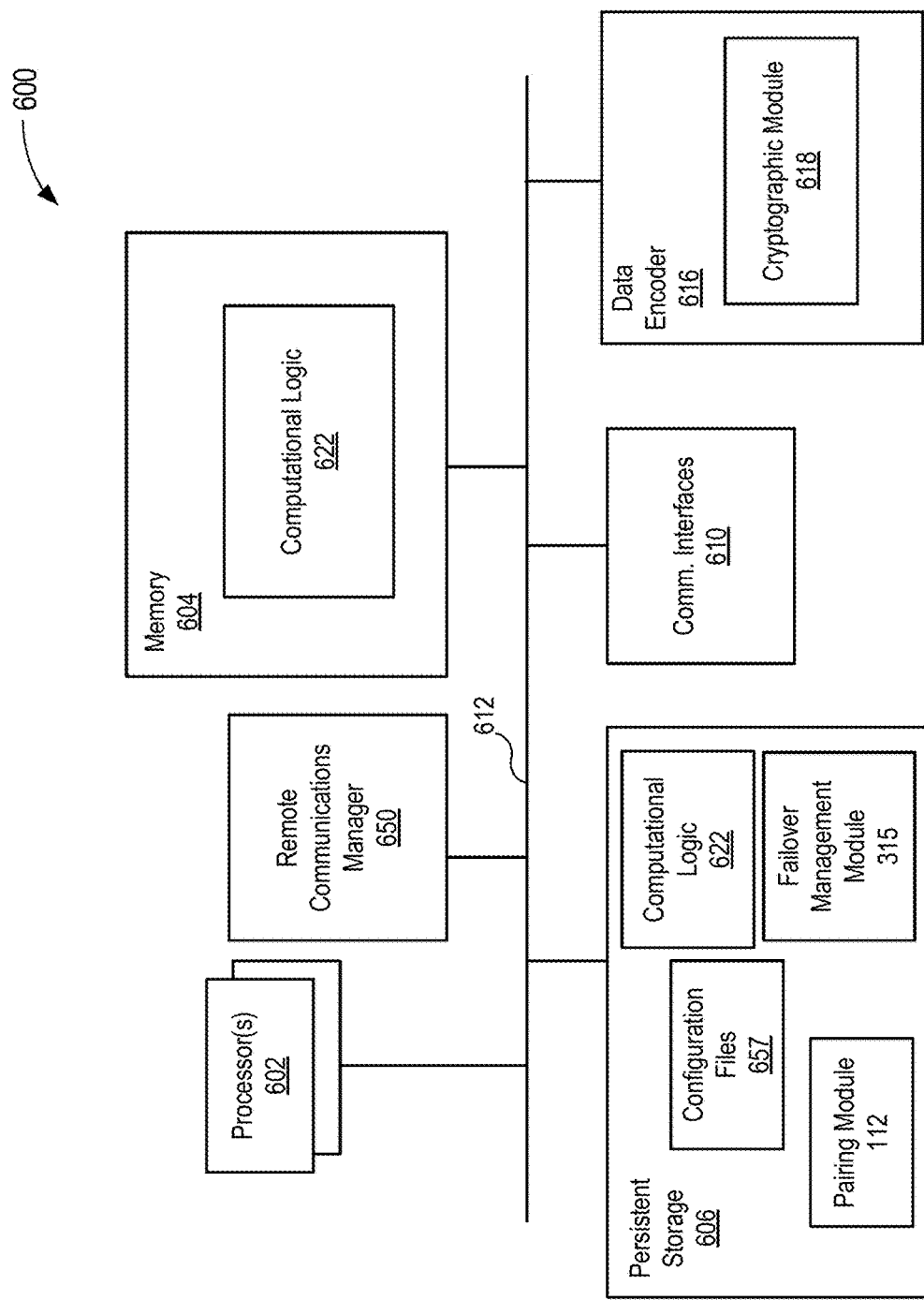
FIG. 6 schematically illustrates an example computer device to be used in implementing an out-of-band (OOB) gateway assisted remote management session, according to various embodiments.

In various embodiments, the gateway identifier and OOB management capability fields may be combined into a single entity wherein a predefined gateway identifier value (e.g. a value of zero) may correspond to a de-asserted state of OOB management capability field 118 while any other identifier values different from the predefined gateway identifier value may correspond to an asserted state of OOB management capability field 118. Note that in various embodiments, remote management session 108 may be a keyboard-video-mouse (KVM) session and gateway 102 may transmit and receive OOB KVM data packets to managed client 130 through LAN port 103. In various embodiments, gateway 102 may include a data encoder (as shown in FIG. 6) to encode KVM data packets received from managed client 130 via LAN port 103. Accordingly WAN port 105 may be coupled to send the encoded KVM data packets through the direct peer-to-peer connection (at "4") to remote management console 134 in embodiments. Note further that as shown, gateway 102 may be coupled in a LAN network 142 to additional managed clients N including respective management controllers N to assist in establishment of additional OOB remote management sessions with gateway 102.

Figure 2:
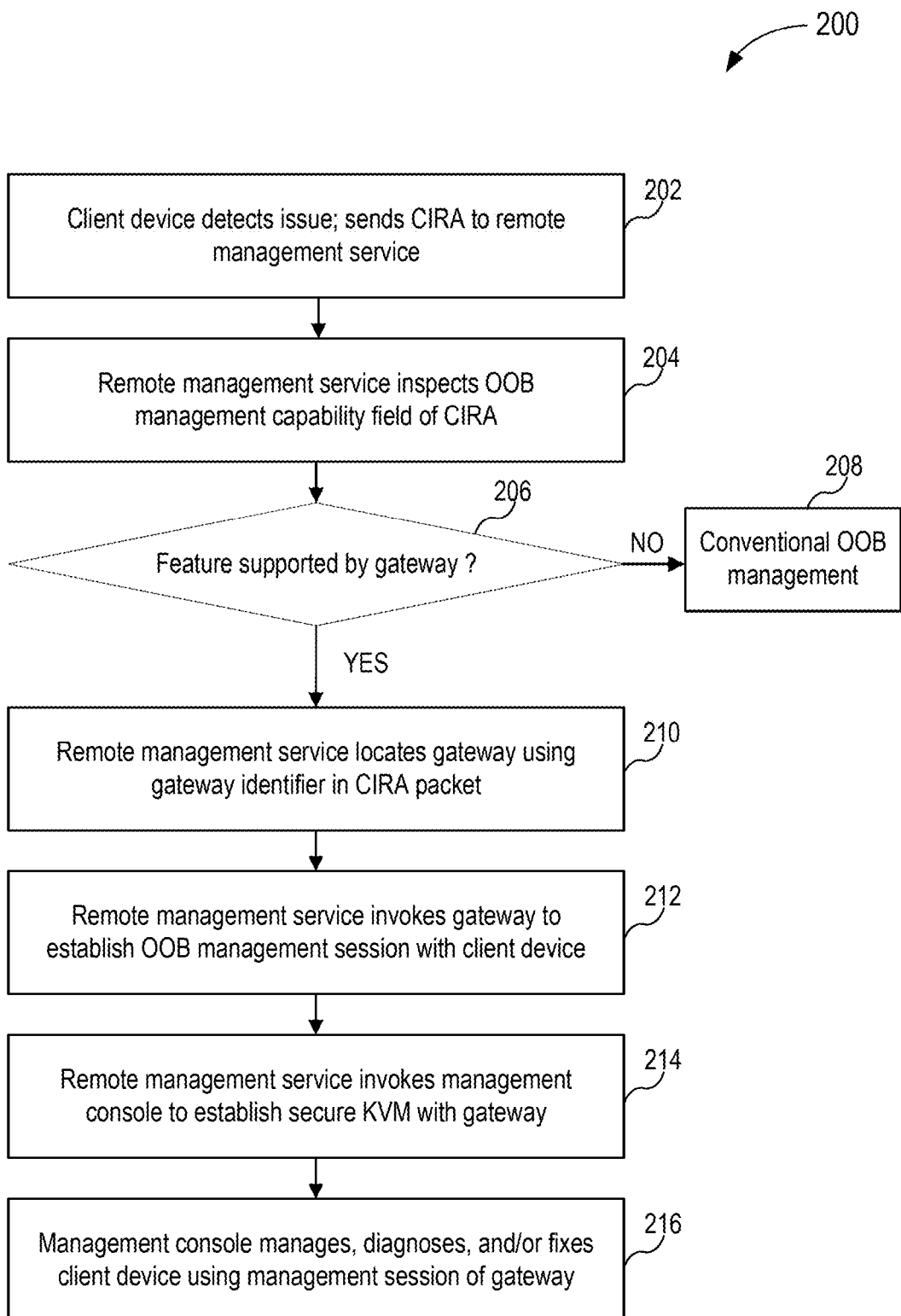
FIG. 2 is a flow diagram illustrating a method of providing the gateway-assisted remote management session of FIG. 1, according to various embodiments.

FIG. 2 is a flow diagram illustrating a method 200 providing the gateway-assisted remote management session of FIG. 1, according to various embodiments. In some embodiments, some or all of method 200 may be practiced by components shown and/or described with respect to the computing environment 100 of FIG. 1, the cloud and internet of things (IoT) network 500 of FIG. 5, and/or the computing device 600 of FIG. 6. In some embodiments, at a block 202, a managed client device (e.g., managed client device 130) may detect an issue that may need diagnosis or repair. In embodiments, the managed client device may send a CIRA packet (e.g., CIRA packet 114 or other network packet indicating request for assistance) to a remote management service (e.g., remote management service 110) requesting a remote management session. Accordingly, in embodiments, a remote server device may receive, through a network port at a remote server device, a WAN network packet including a request for, e.g., a keyboard-video-mouse (KVM) remote management session.

At a next block 204, in the embodiment, the remote management service may inspect an OOB management capability field (e.g., OOB management capability field 118) of the CIRA packet. In embodiments, if OOB management capability field 118 is not indicated, a gateway (e.g., gateway 102) may not support the feature, the answer at decision block 206 is NO. Thus, in the embodiment, the method flows to block 208 where conventional OOB management to diagnose and/or repair the managed client device may take place. In embodiments, in the alternative, at decision block 206, if OOB management capability field 118 is indicated, the method follows YES to a block 210. Accordingly, in the embodiment, at a block 210, the remote management service may locate the gateway using the gateway identifier in the CIRA packet.

In embodiments, the gateway identifier includes at least one of an internet protocol (IP) address, port number, media access control (MAC) address, domain name, unique device identification (UDI), or uniform resource locator (URL), or other suitable identifier that enables identification and/or location of the gateway device to an external remote management console (e.g. remote management console 134). Note that in various alternate embodiments discussed further below in connection with both FIGS. 1-4, the identifier of the gateway device may be provided directly or indirectly by the gateway device for provision into the CIRA packet that may be transmitted from the managed client device.

In embodiments, at block 212, the remote management service may then invoke the gateway to establish an OOB remote management session (e.g., OOB remote management session 108) with the managed client device. In embodiments, the remote server device may include a management session pairing module (e.g., management session pairing module 112, also referred to as "pairing module") to invoke a management controller (e.g., management controller 131) of the managed client device to establish an out-of-band (OOB) connection between the client device and the gateway to send and receive KVM data packets through a LAN connection. In embodiments, at a next block 214, the remote management service may invoke the remote management console to establish a secure KVM remote management session with the gateway. According to the embodiment, the management session pairing module of the remote management service may invoke the remote management console to initiate a peer-to-peer in-band KVM remote management session with the gateway to provide the KVM data packets to perform diagnosis or repair of the managed client device. In embodiments, the pairing module may invoke a secure key exchange between the remote management console and the gateway device to allow the remote management console to intercept secure management network packets from the management controller of the managed client device via the gateway. Finally, at a block 216, in the embodiment, the remote management console may remotely manage, diagnose, and/or fix the client device during the remote management session of the gateway (e.g., OOB remote management session 108).

Figure 3:
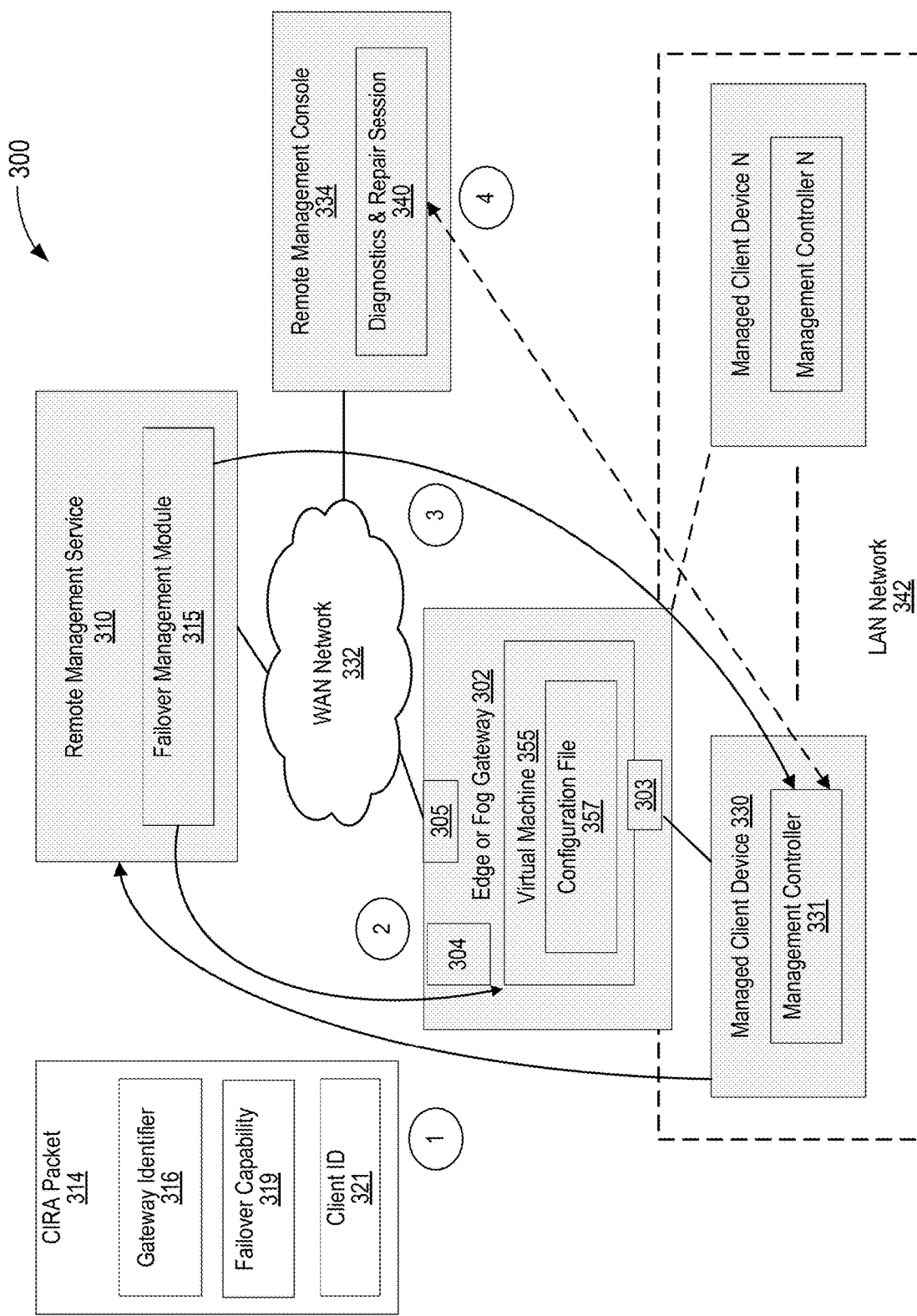
FIG. 3 is a functional block diagram of a computing environment that implements a gateway-assisted failover during a remote management session between a remote management console and a managed client device, according to various embodiments.

Next, FIG. 3 is a block diagram of a computing environment 300 that may implement a gateway-assisted failover for a managed client device during a remote management session, according to various embodiments. In the illustrated embodiments, computing environment 300 may include a remote management service 310 and a remote management console 334 communicatively coupled to an edge or fog gateway device 302 ("gateway 302") in WAN network 332. Remote management service 310 may be included in a remote management server including a failover management module 315. In the embodiment, gateway 302 may be further coupled via a LAN interface having a LAN port 303 to managed client device 330 (or one or more of a plurality of managed client devices, e.g., managed client N) in LAN network 342. In embodiments, gateway 302 may include a virtual machine (VM) 355 of managed client device 330 to assist in providing a temporary failover user interface to managed client device 330. For example, in embodiments, gateway 302 may include local storage coupled to the LAN interface to store a configuration file 357 associated with VM 355 of managed client device 330.

In various embodiments, managed client device 330 may provide a network packet, e.g., CIRA packet 314, to indicate a request for diagnosis or assistance to remote management service 310 (e.g., see "1" in FIG. 3). In embodiments, CIRA packet 314 may include a single hop gateway identifier 316 ("gateway identifier 316"), a failover capability field 319, and a client identifier (ID) field 321. Based on gateway identifier 316, failover management module 315 of remote management service 310 may locate the particular gateway 302 that may be coupled to managed client device 330 and that includes VM 355 of managed client device 330 (e.g., "2" in FIG. 3). In embodiments, gateway 302 may include a processor coupled to the LAN interface and the local storage and operatively coupled to a memory (shown and described in connection with FIG. 6) to access configuration file 357 to wake VM 355 from a sleep mode and to operate VM 355. In embodiments, client ID field 321 may indicate a particular managed client device N to be diagnosed or fixed to allow the processor to run application software on the VM for managed client device 330 or a particular managed client device N. In embodiments, configuration file 357 may be included in a plurality of configuration files stored in the local storage and corresponding to a respective plurality of managed client devices.

Accordingly, in embodiments, failover management module 315 may invoke management controller 331 of managed client device 330 (e.g., see "3") to assist in providing a failover user interface to the managed client device 330 during a remote diagnostics and repair session 340 conducted by remote management console 334. In embodiments, failover management module 315 may redirect a display output received from VM 355 to a local video buffer of managed client device 330 for display. In embodiments, failover management module 315 may further invoke management controller 331 to redirect input/output (I/O) inputs received at managed client device 330 such as including but not limited to, keyboard, mouse, or touch inputs, to VM 355.

In various embodiments, gateway identifier 316 or client identifier ID field 321 may be combined with failover capability field 319 wherein a predefined gateway identifier value or client identifier value (e.g. a value of zero) may correspond to a de-asserted state of failover capability field 319 while any other identifier values different from the predefined gateway identifier value or client identifier value may correspond to an asserted state of failover capability field 319.

Accordingly, in embodiments, managed client device 330 or a user interface of managed client device 330 may remain operational through VM 355 of gateway 302 while being diagnosed and repaired through remote management console 334 (e.g., "4" in FIG. 3). In embodiments, once managed client device 330 is repaired/fixed and resumes operation, failover management module 315 may invoke gateway 302 to close any relevant application software of VM 355, stop KVM redirection, and return VM 355 to sleep mode.

Figure 4:
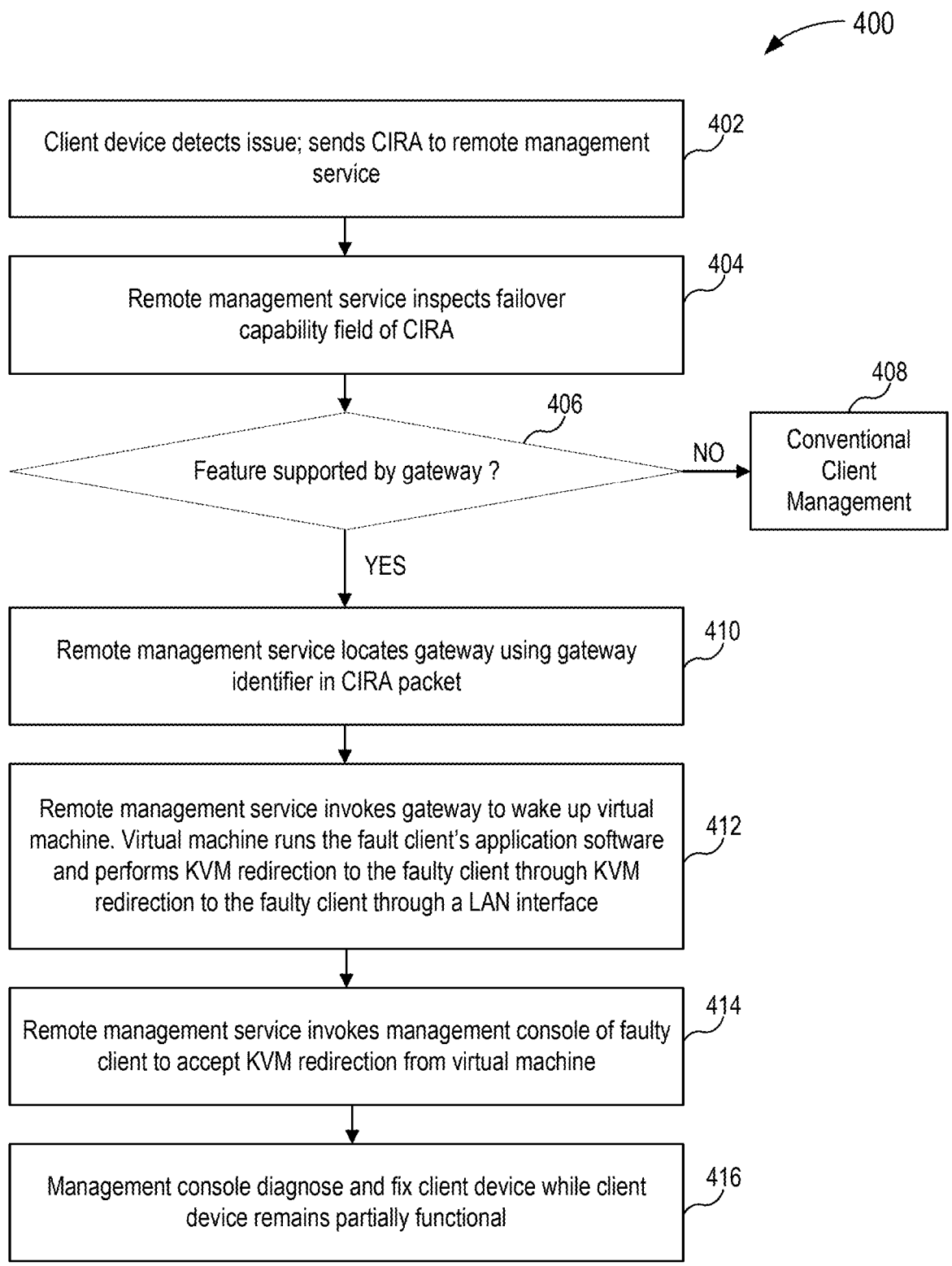
FIG. 4 is a flow diagram illustrating a method of providing the gateway-assisted failover of FIG. 3, according to various embodiments.

Accordingly, FIG. 4 is a flow diagram illustrating a method 400 of providing the gateway-assisted failover of FIG. 3, according to various embodiments. In some embodiments, some or all of the method 400 may be practiced by components shown and/or described with respect to the computing environment 300 of FIG. 3, the cloud and internet of things (IoT) network 500 of FIG. 5, and/or the computing device 600 of FIG. 6. Accordingly, in some embodiments, at a block 402, a managed client device (e.g., managed client device 330 or managed client device N) may detect an issue that may need diagnosis or repair of the managed client device. In embodiments, the managed client device may send a CIRA packet (e.g., CIRA packet 314 or other similar network packet) to a remote management service (e.g., remote management service 310) requesting a remote management session (e.g. diagnostics and repair session 340). For example, in embodiments, a remote server device may receive, through a network port at the remote server device, a WAN network packet including a request for, e.g., a keyboard-video-mouse (KVM) remote management session.

At a next block 404, in the embodiment, the remote management service may inspect a failover capability field (e.g., failover capability field 319) of the CIRA packet. In embodiments, if failover capability field 319 is not indicated, a gateway (e.g., gateway 302) may not support a failover capability feature, the answer at decision block 406 is NO. Thus, in the embodiment, the method flows to block 408 where conventional client management may be performed to diagnose and/or repair the managed client device. In embodiments, in the alternative, at decision block 406, if failover capability field 319 is indicated at YES, the method flows to block 410. Accordingly, in the embodiment, at a block 410, the remote management service may locate gateway 302 using the gateway identifier in the CIRA packet. In embodiments, the gateway identifier includes at least one of an internet protocol (IP) address, port number, media access control (MAC) address, domain name, unique device identification (UDI), or uniform resource locator (URL), or other suitable identifier that enables identification and/or location of the gateway device.

In embodiments, at a next block 412, the remote management service may invoke the gateway to wake up a VM (e.g., VM 355) of the managed client device (e.g. managed client device 330) stored at gateway 302. In embodiments, VM 355 may run application software (e.g., stored in configuration file 357) of a faulty managed client device (e.g. managed client device 330) and perform a KVM redirection through a LAN interface to managed client device 330. In embodiments, the remote management service may redirect a display output of the VM to a storage buffer of the managed client device for display. At a block 414, for the embodiments, the remote management server may then invoke the management controller (e.g., management controller 331) of the managed client device to accept the KVM redirection from the VM during the remote diagnosis or repair session. Accordingly, at block 416, the remote management console may diagnose and repair/fix the managed client device while the managed client device is at least partially or marginally functional during the remote diagnosis session.

Note that with respect to FIGS. 1-4, the gateway identifier may be obtained for the CIRA packet through various embodiments. Note that FIG. 1 is a functional block diagram and although not indicated by the arrow at "1", in embodiments, CIRA packet 114 may be transmitted to remote management service 110 from the management controller 131 of the managed client device (130) via the gateway (e.g., gateways 102 or 302). An identifier of the remote management service 110 may be stored in a secure non-volatile storage location of a managed client device 130 accessible by the management controller 131 during a provisioning process of the management controller 131 to be used at a later time as a destination locator for sending a CIRA packet from the management controller 131 to the remote management service 110. Remote management service identifier includes at least one of an internet protocol (IP) address, port number, media access control (MAC) address, domain name, unique device identification (UDI), or uniform resource locator (URL), or other suitable identifier that enables identification and/or location of the remote management service 110. In an embodiment, the gateway (e.g., gateways 102 or 302) may filter incoming network packets from the LAN port destined for a management port. In some embodiments, the gateway may be communicatively coupled at its LAN port to receive an incoming network packet and to inspect the incoming network packet for a management port number and to identify the network packet as a CIRA packet if the management port number is found. In embodiments, once the gateway identifies the network packet as a CIRA packet, it may insert its gateway identifier into the gateway identifier field to provide the identification of the gateway device to a remote management service.

In another embodiment, a management controller of the managed client may query its gateway for the gateway identifier using a special information query network packet. If the query is successful, in embodiments, the management controller may package the gateway identifier into a CIRA packet and set or indicate an OOB management capability or failover capability field as applicable. In other embodiments, a management controller of the client device may receive the gateway identifier from the gateway device prior to transmitting the CIRA packet to the remote management service and store the gateway identifier in a secure non-volatile storage location (e.g., upon establishment of a network connectivity, e.g., dynamic host configuration protocol (DHCP) connectivity between the managed client and the gateway) to use at a later time when a CIRA packet is to be transmitted.

Figure 5:
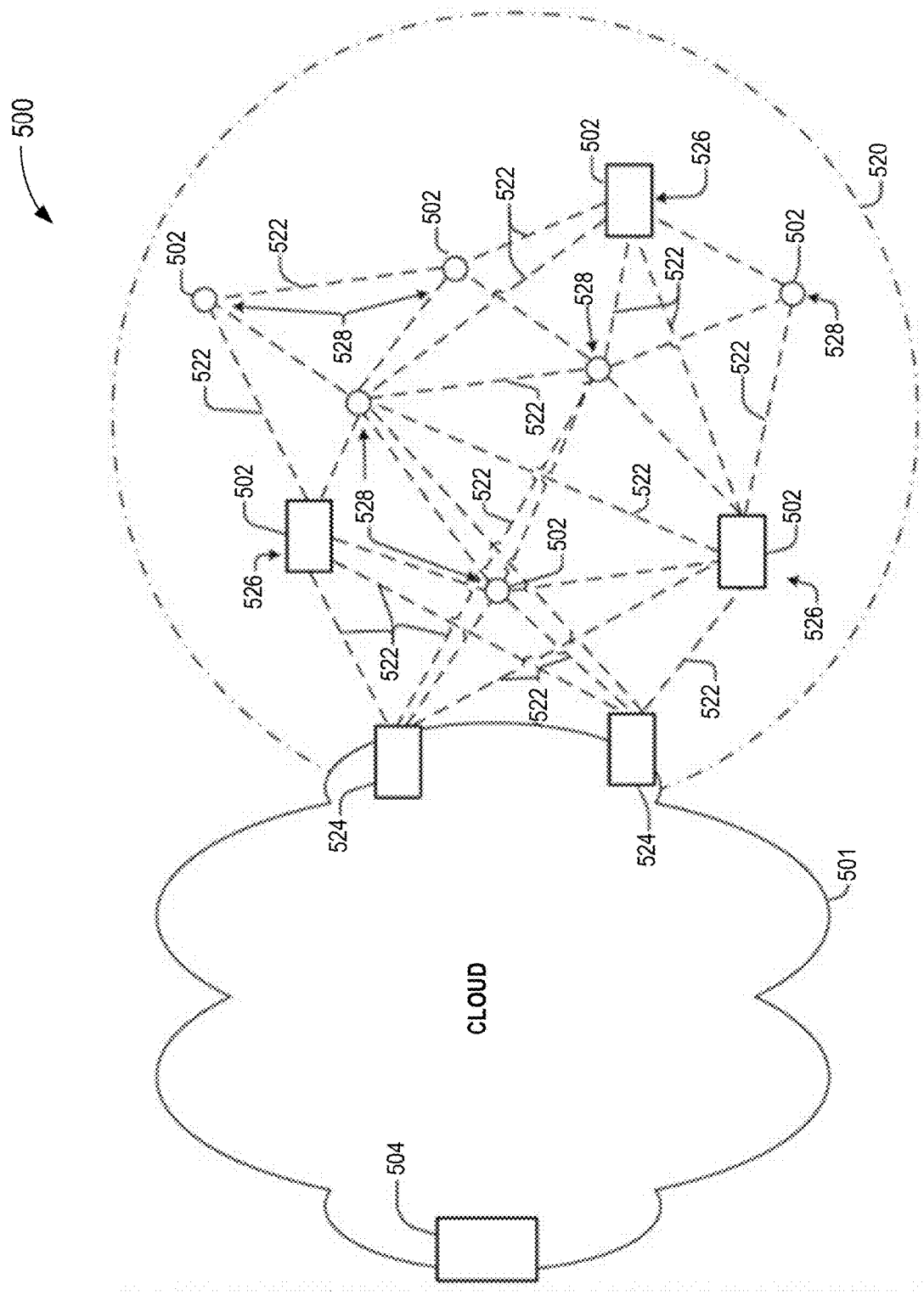
FIG. 5 is a diagram schematically illustrating a topology of a cloud and Internet of Things (IoT) network, according to various embodiments.

FIG. 5 is a diagram schematically illustrating a topology of a cloud and Internet of Things (IoT) network 500, according to various embodiments. In some embodiments, the cloud and IoT network 500 may be a mesh network. In some embodiments, the cloud and IoT network 500 may include a cloud computing network, or cloud 501, in communication with a mesh network of IoT devices 502, that may be termed a fog 520, operating at the edge of the cloud 501. To simplify the diagram, not every IoT device 502 is labeled. In some embodiments, the cloud 501 may include a server 504 that may be or include a remote management console or remote management service (e.g., respective remote management console 134, 334 or remote management service 110, 310).

In some embodiments, the fog 520 may be considered to be a massively interconnected network where a number of IoT devices 502 are in communication with each other, for example, by communication links 522. In various embodiments, the communication links 522 may include wired communication links, wireless communication links, and/or a combination of wired and wireless communication links. Not all communication links are shown and/or labeled for clarity. In some embodiments, one or more of the communication links 522 may be radio communication links. In some embodiments, the cloud 501 and the fog 520 may be established and/or operated using the open interconnect consortium (OIC) standard specification 1.0 released by the Open Connectivity Foundation™ (OCF) in December 2015, or a newer version of the OIC standard specification. This standard allows devices to discover each other and establish communications for interconnects. Other interconnection protocols may also be used in some embodiments, including, for example, the AllJoyn protocol from the AllSeen alliance, the optimized link state routing (OLSR) Protocol, or the better approach to mobile ad-hoc networking (B.A.T-.M.A.N.), or any other suitable technique or protocol.

Three types of IoT devices 502 are shown in this example, gateways 524, data aggregators 526, and sensors 528, although any suitable combination of IoT devices 502 and functionality may be used in various embodiments. In some embodiments, one or more of the gateways 524 may correspond to an edge or Fog gateway having components and/or functionality described with respect to the embodiments of gateways 102 and 302 of respective FIG. 1 and FIG. 3. The gateways 524 may be edge devices that provide communications between the cloud 500 and the fog 520, and may also provide a backend process function for data obtained from the sensors 528, such as motion data, flow data, temperature data, and the like. The data aggregators 526 may collect data from any number of the sensors 528, and may perform the back end processing function for the analysis. The results, raw data, or both may be passed along to the cloud 501 through the gateways 524. The sensors 528 may be full IoT devices 502 in some embodiments, capable of both collecting data and processing the data. In some embodiments, the sensors 528 may be more limited in functionality and may collect the data but may allow the data aggregators 526 or gateways 524 to process the data. In some embodiments, one or more of the data aggregators 526 or other components of the fog 520 may be or include components of a managed client (e.g., the managed client devices 130 or 330 of respective FIG. 1 and FIG. 3).

In some embodiments, communications from any IoT device 502 may be passed along the most convenient path between any of the IoT devices 502 to reach the gateways 524. In these networks, the number of interconnections may provide substantial redundancy, allowing communications to be maintained even with the loss of a number of IoT devices 502 in various embodiments. Further, the use of a mesh network may allow IoT devices 502 that are very low power or located at a distance from infrastructure to be used, as the range to connect to another IoT device 502 may be much less than the range to connect to the gateways 524 in some embodiments.

In some embodiments, the IoT devices 502 may be configured using an imperative programming style, (e.g., with each IoT device 502 having a specific function and communication partners). However, in some embodiments, the IoT devices 502 forming the fog 520 may be cond in a declarative programming style, allowing the IoT devices 502 to reconFIG. their operations and communications, such as to determine needed resources in response to conditions, queries, and device failures.

FIG. 6 illustrates an example computer device 600 that may include components corresponding to and/or implementing various components and methods of FIGS. 1-4, such as a remote management service, remote management console, managed client, or gateways 102 and 302 as described with respect to FIG. 1 and FIG. 3, in accordance with various embodiments. As shown, computer device 600 may include one or more processors 602, each having one or more processor cores, and system memory 604. The processor 602 may include any type of processors, and may include single or multi-core microprocessors, and the like. The processor 602 may be implemented as an integrated circuit in various embodiments. The computer device 600 may include persistent storage devices 606. In general, system memory 604 and/or persistent storage devices 606 may be temporal and/or persistent storage of any type, including, but not limited to, non-volatile memory, optical, magnetic, and/or solid state mass storage, and so forth. Non-volatile memory may include, but is not limited to, electrically erasable programmable read-only memory, phase change memory, resistive memory, and so forth.

The computer device 600 may further include communication interfaces 610 (such as network interface cards, modems, infrared receivers, radio receivers (e.g., Bluetooth), and so forth). The communication interfaces 610 may include communication chips (not shown) that may be configured to operate the computer device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be conFIG.d to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments. In some embodiments, the communication interfaces 610 may operate in accordance with one or more wired networking protocols. In some embodiments, the communication interfaces 610 may operate via one or more LAN ports and/or one or more WAN ports.

Accordingly, note that as described in connection with embodiments of FIG. 3 and FIG. 4, a gateway apparatus for remote management of a client device may include a LAN interface and a local storage coupled to the LAN interface to store a configuration file associated with a virtual machine (VM) of the client device. In embodiments, a processor coupled to the LAN interface and the local storage may be operatively coupled to a memory to access the configuration file to wake the VM from a sleep mode and to operate the VM. In embodiments, operating the VM may include redirection of a display output of the VM to the client device via an egress port of the LAN interface to provide a failover user interface to the client device during a remote diagnosis and/or repair session.

The above-described computer device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and persistent storage devices 606 may be employed to store a working copy and a permanent copy of the programming instructions, such as drivers, for the operation of various components of computer device 600, including but not limited to operation of gateways 102 and 302 as well as the remote management services of FIGS. 1 and 3, an operating system of computer device 600, and/or one or more applications, collectively referred to as computational logic 622. The various elements may be implemented by assembler instructions supported by processor(s) 602 or high-level languages that may be compiled into such instructions.

The permanent copy of the programming instructions may be placed into persistent storage devices 606 in the factory or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

For some embodiments, at least one of processors 602 may be packaged together with a storage medium having all or portions of computational logic 622 configured to facilitate aspects of embodiments described herein to form a System in Package (SiP) or a System on Chip (SoC).

The computer device 600 may include or otherwise be associated with a computer device or an apparatus that may include components and/or implement methods described with respect to FIGS. 1-4, such as the gateways 102 and 302, remote management consoles 134 and 334, remote management services 110 and 310 including the management session pairing module 112 and/or failover management module 315, virtual machine 355 (e.g., configuration files 657), the method 200, the method 400, one or more components of the cloud and IoT mesh network of FIG. 5, and/or other components or methods in accordance with various embodiments. In some embodiments, one or more components such as processor 602 may be included as a part of the gateway 102 or 302. In various embodiments, computer device 600 may comprise a gateway that may include a data encoder 616 to encode KVM data packets received from a client device.

In various embodiments, data encoder 616 of a gateway may comprise a coder-decoder (codec) configured to encode, decode or transcode video data in accordance with a Motion Picture Experts Group-2 (MPEG-2), H.264 Advanced Video Coding (H264/AVC), H.265 High Efficiency Coding (H265/HEVC), VP9, VC-1 or Motion JPEG (MJPEG) video compression standard or any other suitable video compression standard.

In various embodiments, gateway 102 or 302 or computer device 600 may also include a cryptographic module 618 configured to encrypt transmitted KVM data packets or to decrypt received KVM data packets. Cryptographic module 618 may be configured to encrypt or decrypt data in accordance with data encryption standard (DES), advanced encryption standard (AES) or any other suitable encryption standard.

In various implementations, computer device 600 may comprise one or more components of a gateway, a router, a data center, a laptop, a netbook, a notebook, an ultrabook, a smartphone, a tablet, a personal digital assistant (PDA), an ultra mobile PC, an embedded computing device, a mobile phone, or a digital camera. In further implementations, the computer device 600 may be any other electronic device that processes data.

Figure 7:
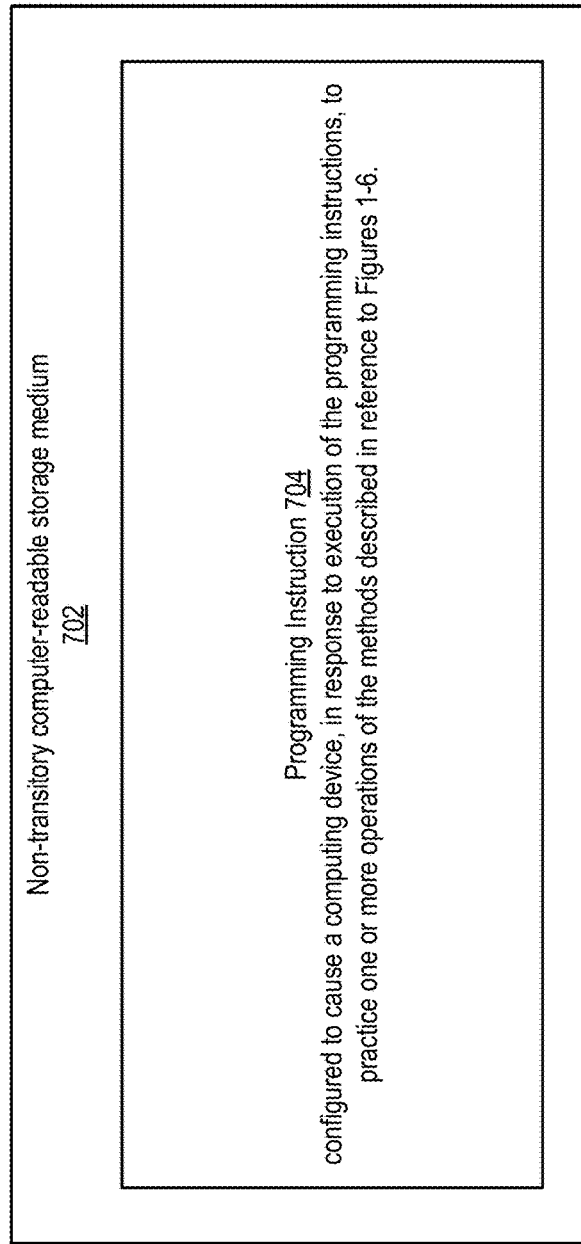
FIG. 7 illustrates an example storage medium with instructions configured to enable an apparatus to practice various aspects of the present disclosure, in accordance with various embodiments.

FIG. 7 illustrates example computer-readable storage medium 702 having instructions configured to practice all or selected ones of the operations associated with the computer device 600 and/or gateways 102 and 302, remote management consoles 134 and 334, remote management services 110 and 310 including the management session pairing module 112 and/or failover management module 315, virtual machine(s) 355 and associated configuration files 657, the method 200, the method 400, the cloud and IoT network 500 described with respect to FIG. 5; and/or one or more of the methods 200 and/or 400 described with respect to FIGS. 2 and 4, in accordance with various embodiments. As illustrated, computer-readable storage medium 702 may include a number of programming instructions 704. The storage medium 702 may represent a broad range of non-transitory persistent storage medium known in the art, including but not limited to flash memory, dynamic random access memory, static random access memory, an optical disk, a magnetic disk, etc. Programming instructions 704 may be configured to enable a device, e.g., computer 600 of FIG. 6 and/or gateways 102 or 302 of FIGS. 1 and 3, in response to execution of the programming instructions 704, to perform, e.g., but not limited to, various operations described for the management session pairing module 112, failover management module 315, gateways 102 and 302, one or more components of the cloud and IoT network 500 of FIG. 5, and/or one or more of the methods 200 and/or 400 described with respect to FIGS. 2 and 4. In alternate embodiments, programming instructions 704 may be disposed on multiple computer-readable storage media 702. In alternate embodiments, storage medium 702 may be transitory, e.g., signals encoded with programming instructions 704.

Referring back to FIG. 6, for an embodiment, at least one of processors 602 may be packaged together with memory having all or portions of computational logic 622 configured to practice aspects described for the remote communications manager, remote management service, and/or other components of FIGS. 1-4, operations of one or more components of the cloud and IoT network 500 of FIG. 5, and/or one or more of the methods 200 and/or 400 described with respect to FIGS. 2 and 4. For an embodiment, at least one of processors 602 may be packaged together with memory having all or portions of computational logic 622 configured to practice aspects described for the remote communications manager 104, remote management service 110 or 310 and/or other components of FIG. 1 and FIG. 3, operations of one or more components of the cloud and IoT network 500 of FIG. 5, and/or one or more of the methods 200 and/or 400 described with respect to FIGS. 2 and 4 to form a System in Package (SiP). For an embodiment, at least one of processors 602 may be integrated on the same die with memory having all or portions of computational logic 622 configured to practice aspects described for the various components of FIG. 1 and FIG. 3, operations of one or more components of the cloud and IoT network 500 of FIG. 5, and/or one or more of the methods of FIGS. 1-4. For an embodiment, at least one of processors 502 may be packaged together with memory having all or portions of computational logic 522 configured to practice aspects of the embodiments described in FIGS. 1-4, operations of one or more components of the cloud and IoT network 500 of FIG. 5, and/or one or more of the methods described with respect to FIGS. 2 and 4 to form a System on Chip (SoC). For at least one embodiment, the SoC may be utilized in, e.g., but not limited to, a mobile computing device such as a wearable device, an internet of things (IoT) device, and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Figure 8:
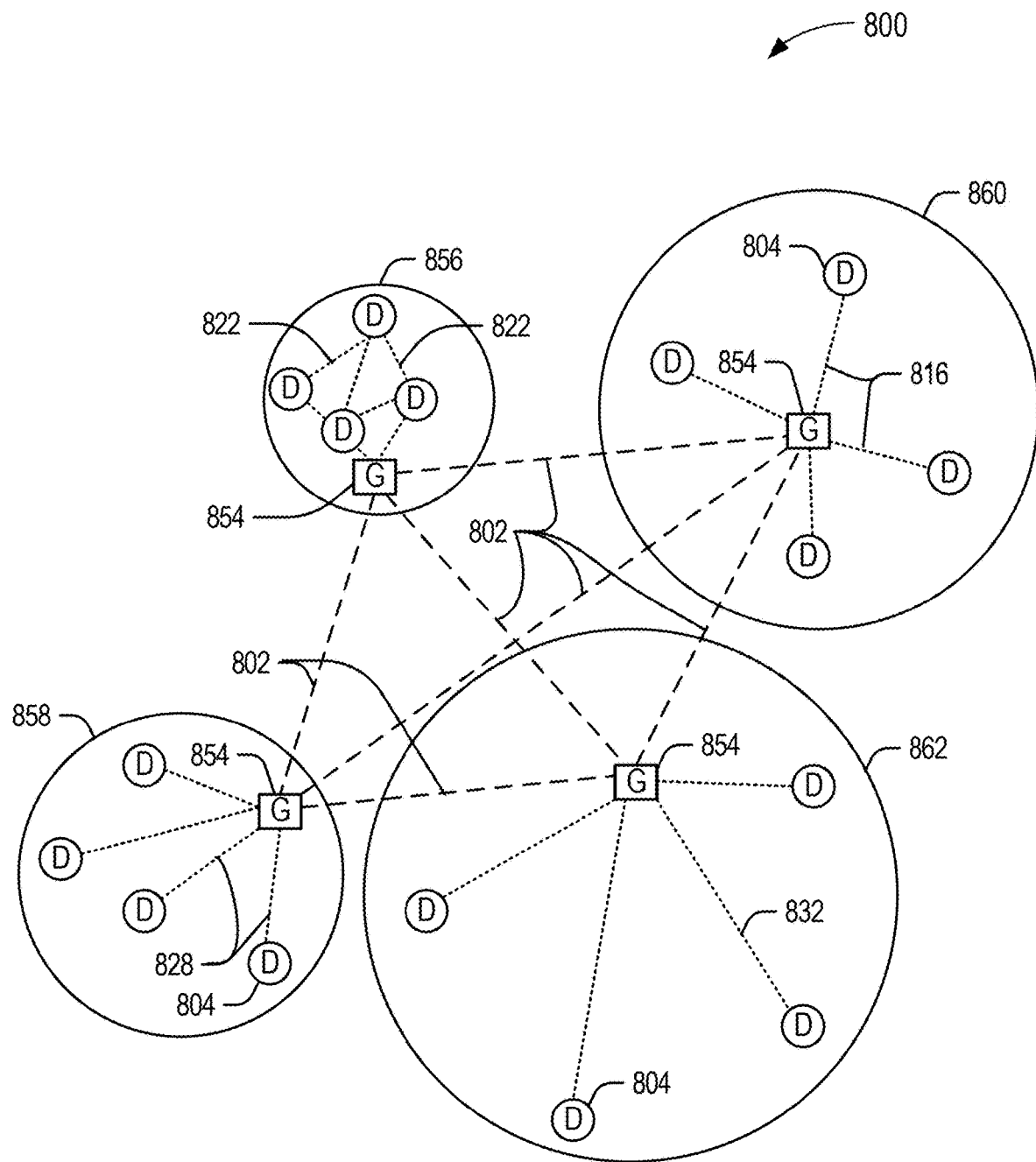
FIG. 8 illustrates a domain topology for respective internet-of-things (IoT) networks coupled through links to respective gateways, according to an example.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIG. 7 and FIG. 5, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854 and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices. In some embodiments, one or more of the gateways 854 may correspond to an edge or Fog gateway having components and/or functionality described with respect to the embodiments of gateway 102 and/or 302 of FIG. 1 and FIG. 3.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in FIGS. 8 and 9.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 5.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 9:
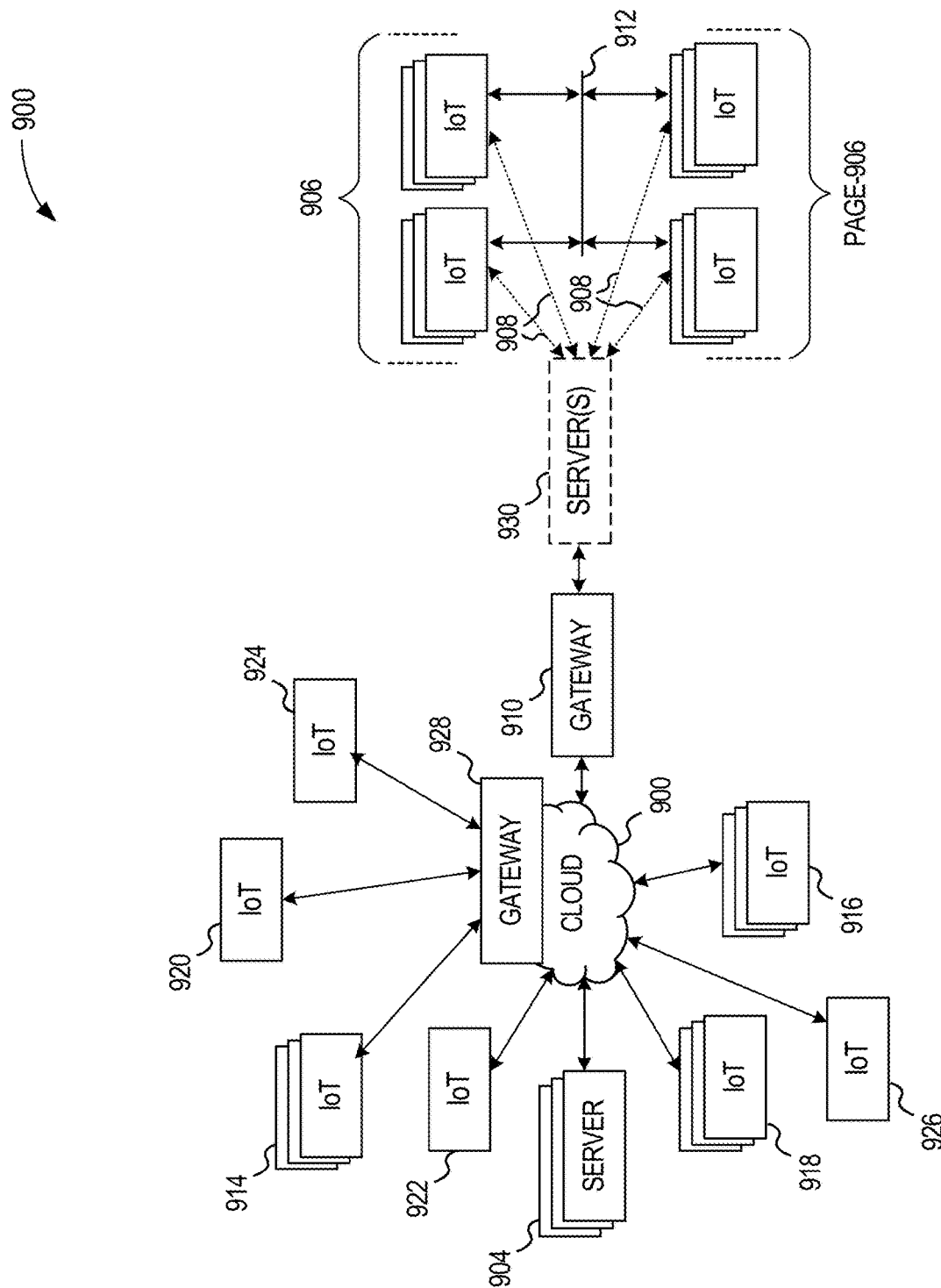
FIG. 9 illustrates a block diagram of a network illustrating communications among a number of IoT devices, according to an example.

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900. In some embodiments, one or more of the gateways 910 or 928 may correspond to an edge or Fog gateway having components and/or functionality described with respect to gateways 102 or 302 of FIGS. 1 and 3, including the remote communications manager 104. In some embodiments, one or more of the one or more servers 904 may be or include a remote management console or remote management server including a remote management service as described in connection with FIG. 1 and FIG. 3.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 5), or a combination therein. The groups of IoT devices may be deployed in various residential, commercial, and industrial settings (including in both private or public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 5).

Figure 10:
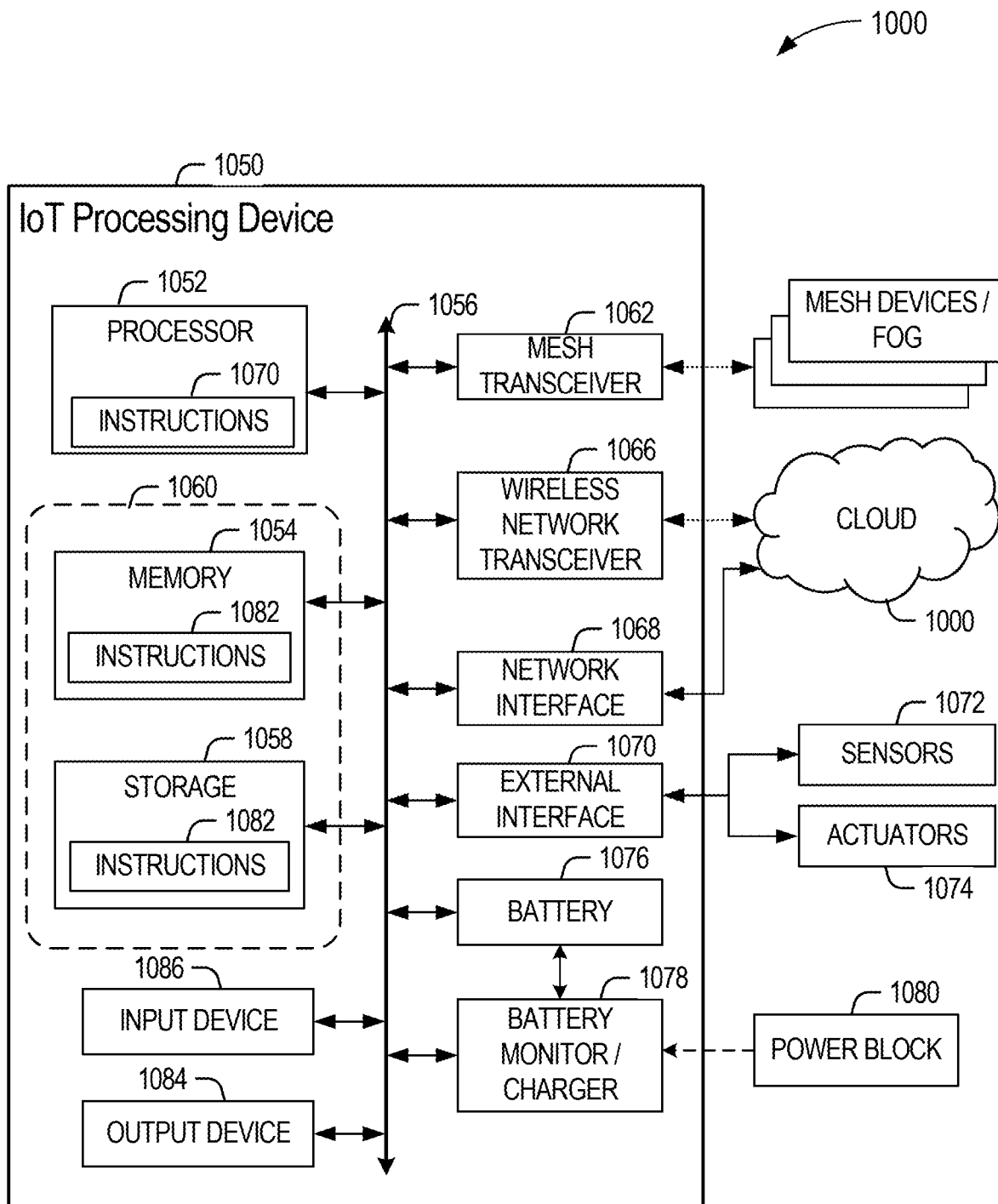
FIG. 10 illustrates a block diagram for an example IoT processing system architecture upon which any one or more of the techniques (e.g., operations, processes, methods, and methodologies) discussed herein may be performed, according to an example.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point-to-point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional MC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the IoT device 1050. The processor 1052 may access the non-transitory, machine-readable medium 1060 over the interconnect 1056. For instance, the non-transitory, machine-readable medium 1060 may be embodied by devices described for the storage 1058 of FIG. 10 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram (s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

EXAMPLES

Example 1 may include an apparatus for remote management of a client computer, the apparatus comprising a local area network (LAN) port; a wide area network (WAN) port; and a remote communications manager coupled to the LAN port and the WAN port and operatively coupled to a processor to invoke the managed client computer to establish a remote management session with a remote management service, wherein at least a portion of a connection between the managed client computer and the remote management service to occur via an out-of-band (OOB) channel between the apparatus and the managed client computer through the LAN port, wherein an identifier of the apparatus, as a gateway device between the managed client computer and the remote management service is provided to the remote management service.

Example 2 may include the apparatus of Example 1, wherein the remote management session is a keyboard-video-mouse (KVM) session and the apparatus, as a gateway device, is to transmit and receive OOB KVM data packets to the managed client computer through the LAN port.

Example 3 may include the apparatus of Example 2, wherein the apparatus further includes a data encoder to encode KVM data packets received from the managed client computer via the LAN port.

Example 4 may include the apparatus of Example 1, wherein the WAN port is coupled to send the encoded KVM data packets through an in-band peer-to-peer connection to a remote management console and the remote management console is invoked by a pairing session of the remote management service to initiate the in-band peer-to-peer connection.

Example 5 may include the apparatus of Example 1, wherein the identifier is included in a client initiated remote access (CIRA) packet from the managed client computer that requests the remote management session and wherein the CIRA packet has a gateway identifier field, an out-of-band (OOB) management capability field, or both.

Example 6 may include the apparatus of Example 1, wherein the apparatus, as a gateway device, further filters incoming network packets from the LAN port destined for a management port and inserts its gateway identifier into a gateway identifier field to provide the identifier of the gateway device to the remote management service.

Example 7 may include the apparatus of Example 1, wherein the identifier of the apparatus as a gateway device includes at least one of an internet protocol (IP) address, port number, media access control (MAC) address, domain name, unique device identification (UDI) or uniform resource locator (URL) of the gateway device.

Example 8 may include the apparatus of any one of Examples 1-7, wherein the apparatus is a single hop edge or fog gateway of the managed client computer.

Example 9 is a method for remote management of a client device, the method comprising receiving, through a network port at a remote server device, a WAN network packet including a request for a keyboard-video-mouse (KVM) remote management session that includes an identifier of a gateway device coupled to a local area network (LAN) of the client device to be remotely managed by the remote server device; and using the identifier of the gateway device to assist in: invoking by a pairing module of the remote server device, an out-of-band (OOB) connection between the client device and the gateway device, where the client device sends and receives KVM data packets through a LAN connection to and from the gateway device to establish the KVM remote management session.

Example 10 may include the method of Example 9, further comprising invoking by the pairing module of the remote server device, a remote management console to initiate a peer-to-peer in-band KVM remote management session with the gateway device to provide the KVM data packets to perform diagnosis or repair of the client device.

Example 11 may include the method of Example 9, further comprising invoking by the remote server device a secure key exchange between a remote management console and the gateway device to allow the remote management console to intercept secure management network packets from a management controller of the client device via the gateway device.

Example 12 may include the method of any one of Examples 9-11, wherein the WAN network packet is a CIRA packet transmitted from the client device and wherein the client device receives the identifier from the gateway device prior to transmitting the CIRA packet.

Example 13 may include one or more non-transitory computer-readable media (CRM) comprising instructions that cause a remote management server, in response to the execution of the instructions by the remote management server, to receive an identifier of a gateway device communicatively coupled to a local area network (LAN) of a managed client device; use the received identifier to invoke a management controller of the managed client device to initiate an out-of-band (OOB) connection over the LAN between the managed client device and the gateway device to establish a remote diagnosis and repair session.

Example 14 may include the one or more non-transitory CRM of Example 13, wherein the instructions are also to cause the remote management server to invoke a remote management console to initiate a peer-to-peer in-band KVM remote management session with the gateway device to provide KVM data packets for the remote diagnosis and repair session.

Example 15 may include the one or more non-transitory CRM of Example 13, wherein the instructions are also to cause the remote management server to invoke a secure key exchange between a remote management console and the gateway device to allow the remote management console to intercept secure management network packets from a management controller co-located with the managed client device via the gateway device.

Example 16 may include the one or more non-transitory CRM of any one of Examples 13-15, wherein the instructions to cause the remote management server to receive the identifier include instructions to receive the identifier from the management controller via the gateway device.

Example 17 may include the one or more non-transitory CRM of any one of Examples 13-16, wherein the instructions to cause the remote management server to receive the identifier include instructions to receive an identifier that has been stored in a secure non-volatile storage location of the managed client device.

Example 18 is a system for establishing a remote management session of a client device, the system comprising a management server device including: a processor; a memory coupled to the processor; and a network interface operatively coupled to the processor and the memory and including a management port through which to send or receive a network packet that includes a gateway identifier; and a gateway device communicatively coupled to the management server device and including a remote communications manager coupled to a local area network (LAN) port and a wide area network (WAN) port, and wherein the management server device uses the gateway identifier to identify the gateway device to invoke the client device to establish the remote management session through an out-of-band (OOB) LAN connection with the gateway device.

Example 19 may include the system of Example 18, further comprising a remote management console communicatively coupled to the management server device and communicatively coupled to the gateway device through a WAN to provide keyboard-video-mouse (KVM) data packets to the gateway device for the remote management session.

Example 20 may include the system of Example 19, further comprising the client device, wherein the client device includes a management controller to establish the remote management session with the remote communications manager of the gateway device.

Example 21 may include the system of any one of Examples 18-20, wherein the gateway device includes a cryptographic engine to encrypt keyboard-video-mouse (KVM) data packets to be transmitted from the gateway device to the remote management console during the remote management session.

Example 22 may include the system of any one of Examples 18-20, wherein the gateway device includes a cryptographic engine to decrypt keyboard-video-mouse (KVM) data packets received from the remote management console during the remote management session.

Example 23 may include a gateway apparatus for remote management of a client device comprising: a local area network (LAN) interface; a local storage coupled to the LAN interface to store a configuration file associated with a virtual machine (VM) of the client device; and a processor coupled to the LAN interface and the local storage and operatively coupled to a memory to access the configuration file to wake the VM from a sleep mode and to operate the VM including redirection of a display output of the VM to the client device via an egress port of the LAN interface to provide a failover user interface to the client device during a remote diagnosis and/or repair session.

Example 24 may include the gateway apparatus of Example 23, wherein an ingress port of the LAN interface receives a client-initiated-remote-access (CIRA) network packet, and wherein the gateway apparatus inserts its own identifier into a gateway identifier field and sets a failover capability field.

Example 25 may include the gateway apparatus of Example 23, wherein the configuration file is included in a plurality of configuration files stored in the local storage corresponding to a respective plurality of client devices.

Example 26 may include the gateway apparatus of Example 24, wherein the gateway apparatus to access the configuration file based on a client identifier field in a CIRA network packet received at a management service and a processor to run application software for a selected client device on the VM.

Example 27 may include a method for management of a client device, the method comprising: receiving at a wide-area-network (WAN) port of a management server, a network packet from the managed client device including a gateway identifier and request of a remote diagnosis or repair session; based on the gateway identifier, locating by the management server, a gateway device coupled to a local area network (LAN) interface of the managed client device; and invoking by the management server, the gateway device via the LAN interface to: wake up a virtual machine (VM) of the managed client device stored at the gateway device; and redirect a display output of the VM to the managed client device to keep a user interface of the managed client device at least partially functional during the remote diagnosis or repair session.

Example 28 may include the method of Example 27, further comprising inspecting by the management server, a failover capability field in the network packet and proceeding with the locating and invoking of the gateway device after failover capability is determined.

Example 29 may include the method of Example 27, wherein receiving the network packet includes receiving a gateway identifier including at least one of an internet protocol (IP) address, port number, media access control (MAC) address, domain name, unique device identification (UDI) or uniform resource locator (URL) of the gateway device.

Example 30 may include the method of Example 27, further comprising invoking by the management server, a remote management console of the managed client device to accept a keyboard-video-mouse (KVM) redirection from the VM during the remote diagnosis or repair session.

Example 31 may include the method of any one of Examples 27-30, further comprising invoking by the management server, the gateway device to operate the VM to run application software stored in a configuration file corresponding to a faulty managed client device.

Example 32 may include the method of any one of claims 27-31, further comprising invoking by a failover management module of the management server, redirection of input/output (I/O) inputs received at the managed client device to the VM, wherein the I/O inputs include but are not limited to, keyboard, mouse, or touch inputs.

Example 33 may include one or more non-transitory computer-readable media (CRM) comprising instructions that cause a management server, in response to the execution of the instructions by the management server, to: receive at a wide-area-network (WAN) port of the management server, a network packet from a managed client device including a gateway identifier and request of a remote diagnosis or repair session; based on the gateway identifier, locate by the management server, a gateway device coupled to a local area network (LAN) interface of the managed client device; and invoke by the management server, the gateway device via the LAN interface to: wake up a virtual machine (VM) of the managed client device stored at the gateway device; and redirect a display output of the VM to the managed client device to keep a user interface of the managed client device at least partially functional during the remote diagnosis or repair session.

Example 34 may include the one or more non-transitory CRM of claim 33, wherein the instructions to invoke the gateway device to wake up a virtual machine (VM) of the managed client device includes instructions to select a configuration file for a faulty managed client device out of plurality of configuration files for other managed client devices stored at the gateway device.

Example 35 may include the one or more non-transitory CRM of Example 34, wherein the instructions to invoke the gateway device to wake up the virtual machine (VM) of the managed client device to access the configuration file is based on a client identifier field in a CIRA network packet received at the management server.

Example 36 may include the one or more non-transitory CRM of Example 33, wherein the gateway identifier includes at least one of an internet protocol (IP) address, port number, media access control (MAC) address, domain name, unique device identification (UDI) or uniform resource locator (URL) of the gateway device.

Example 37 may include the one or more non-transitory CRM of any one of Examples 33-36, wherein the instructions are also to cause the management server to invoke a remote management console of the managed client device to accept a keyboard-video-mouse (KVM) redirection from the VM during the remote diagnosis or repair session.

Example 38 may include the one or more non-transitory CRM of any one of Examples 33-37, wherein the instructions are also to cause the management server to redirect by a failover management module of the management server, input/output (I/O) inputs received at the managed client device to the VM, wherein the I/O inputs include but are not limited to, keyboard, mouse, or touch inputs.

Example 39 may include a gateway apparatus, comprising: first means for storing a configuration file associated with a virtual machine (VM) of a client device; and second means for accessing the configuration file to wake the VM from a sleep mode and to operate the VM including redirection of a display output of the VM to the client device to provide a failover user interface to the client device during a remote diagnosis and/or repair session.

Example 40 may include the gateway apparatus of Example 39, wherein the second means further comprises means for accessing the configuration file based on an identifier of the client device received from a management server.

Example 41 may include the apparatus of any one of Examples 39-40, further comprising third means coupled to the second means for receiving for the virtual machine, a redirection of keyboard, mouse, or touch inputs received at the client device.

Various embodiments may include any suitable combination of the above-described embodiments including alternative (or) embodiments of embodiments that are described in conjunctive form (and) above (e.g., the "and" may be "and/or"). Furthermore, so me embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The invention claimed is:

1. An apparatus for remote management of a client computer, the apparatus comprising:
   a local area network (LAN) port;
   a wide area network (WAN) port; and
   a remote communications manager coupled to the LAN port and the WAN port and operatively coupled to a processor to invoke the managed client computer to establish a remote management session with a remote management service, wherein at least a portion of a connection between the managed client computer and the remote management service is to occur via an out-of-band (OOB) channel between the apparatus and the managed client computer through the LAN port, wherein the apparatus is a gateway that is a single hop edge or fog gateway unknown to the remote management service as a gateway of the managed client computer; and
   wherein the gateway receives a client initiated remote access (CIRA) packet from the managed client computer and sends the CIRA packet to the remote management service, wherein the CIRA packet includes an identifier of the apparatus and a field indicating that the gateway supports diagnosis and repair of the managed client computer via a feature where keyboard-video-mouse (KVM) data packets are received by the gateway from a remote management console on an in-band peer-to-peer connection and provided from the gateway to the managed client computer via the OOB channel.

2. The apparatus of claim 1, wherein the remote management session is a keyboard-video-mouse (KVM) session and the apparatus, as a gateway device, is to transmit and receive OOB KVM data packets to the managed client computer through the LAN port.

3. The apparatus of claim 2, wherein the apparatus further includes a data encoder to encode KVM data packets received from the managed client computer via the LAN port.

4. The apparatus of claim 1, wherein the WAN port is coupled to send encoded KVM data packets through the in-band peer-to-peer connection to the remote management console and the remote management console is invoked by a pairing session of the remote management service to initiate the in-band peer-to-peer connection.

5. The apparatus of claim 1, wherein the identifier is included in the CIRA packet from the managed client computer that requests the remote management session and wherein the CIRA packet has a gateway identifier field, an out-of-band (OOB) management capability field, or both.

6. The apparatus of claim 1, wherein the apparatus, as a gateway device, further filters incoming network packets from the LAN port destined for a management port and inserts its gateway identifier into a gateway identifier field to provide the identifier of the gateway device to the remote management service.

7. The apparatus of claim 1, wherein the identifier of the apparatus as a gateway device includes at least one of an internet protocol (IP) address, port number, media access control (MAC) address, domain name, unique device identification (UDI) or uniform resource locator (URL) of the gateway device.

8. A method for remote management of a client computer, the method comprising:
   invoking, by a gateway, the managed client computer to establish a remote management session with a remote management service, wherein the gateway is a single hop edge or fog gateway unknown to the remote management service as a gateway of the managed client computer and wherein at least a portion of a connection between the managed client computer and the remote management service is to occur via an out-of-band (OOB) channel between the gateway and the managed client computer through a LAN port;
   receiving a client initiated remote access (CIRA) packet from the managed client computer; and
   sending by the gateway, the CIRA packet to the remote management service, wherein the CIRA packet has an identifier of the gateway and a field indicating that the gateway supports diagnosis and repair of the managed client computer via a feature where keyboard-video-mouse (KVM) data packets are received by the gateway from a remote management console on an in-band peer-to-peer connection and provided from the gateway to the managed client computer via the OOB channel.

9. The method of claim 8, wherein the remote management session is a KVM session and wherein the KVM data packets are transmitted to and from the managed client computer through the LAN port.

10. The method of claim 9, further comprising encoding KVM data packets received from the managed client computer.

11. The method of claim 8, wherein the in-band peer-to-peer connection is initiated by a pairing session of the remote management service.

12. The method of claim 8, wherein the identifier is included in the CIRA packet from the managed client computer that requests the remote management session and wherein the CIRA packet has a gateway identifier field, an out-of-band (OOB) management capability field, or both.

13. The method of claim 12, further comprising filtering incoming network packets from the LAN port destined for a management port and inserting the identifier of the gateway into the gateway identifier field to provide the identifier of the gateway device to the remote management service.

14. The method of claim 8, wherein the identifier of the gateway includes at least one of an internet protocol (IP) address, port number, media access control (MAC) address, domain name, unique device identification (UDI) or uniform resource locator (URL) of the gateway.

* * * * *